Patented Dec. 12, 1922.

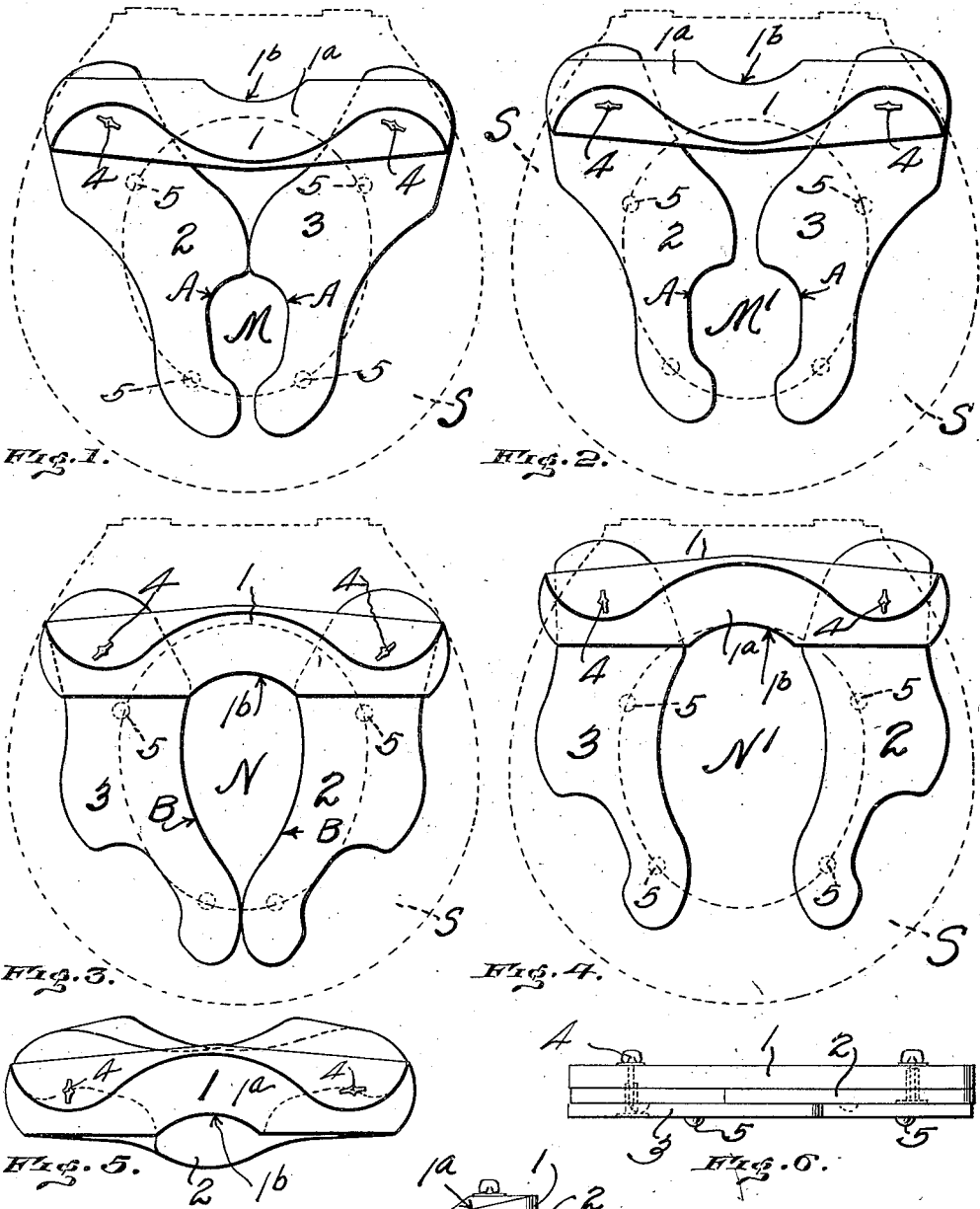

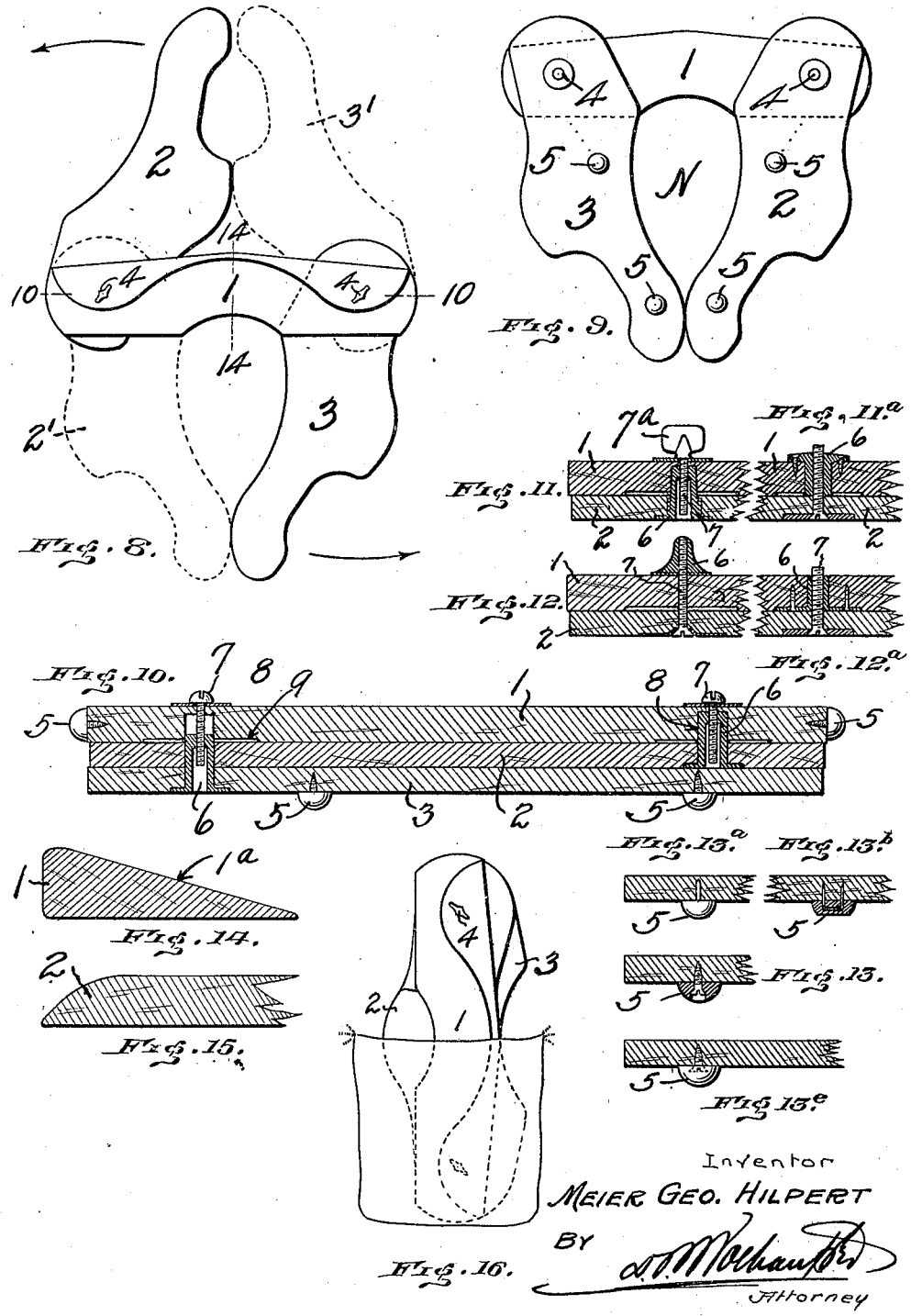

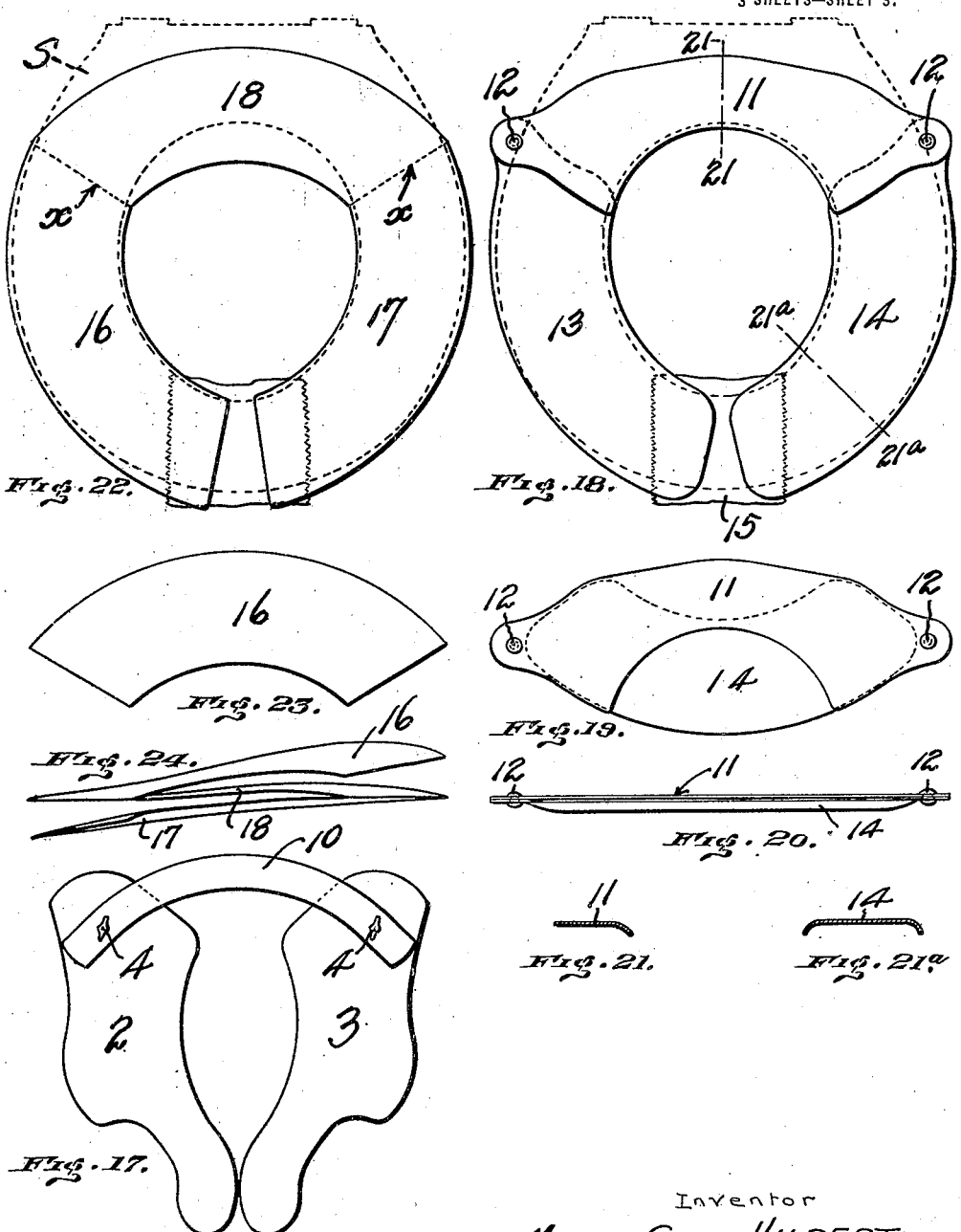

1,438,491

UNITED STATES PATENT OFFICE.

MEIER GEO. HILPERT, OF HARRISBURG, PENNSYLVANIA.

AUXILIARY CLOSET SEAT.

Application filed October 7, 1918. Serial No. 257,192.

*To all whom it may concern:*

Be it known that I, MEIER G. HILPERT, citizen of the United States, residing at Harrisburg, in the county of Dauphin and State of Pennsylvania, have invented certain new and useful Improvements in Auxiliary Closet Seats, of which the following is a specification.

This invention relates to an auxiliary closet seat for use over and upon an ordinary closet seat to adapt the latter for use by children of different ages, and as a sanitary seat cover for adults.

To this end it is proposed to provide a seat structure involving special features of improvement which are susceptible of embodiment in such forms that a seat may be provided to safely and cleanly support children of various ages, and size, from infancy to youth, while also adaptable for adults as a convenient and sanitary closet seat cover or protector, capable of easy and accurate adjustment when open for use, and readily foldable for carrying. Thus, a primary object of the invention is the provision of a readily adjustable and collapsible or foldable seat which will meet the requirements of growing children as well as adults in the home and in public places.

Another object of the invention is to provide a seat which involves a maximum margin of safety in its use by children, both as to relative set or adjustment and anchorage upon the ordinary wooden seat. That is to say it is proposed to so design and construct the various parts of the seat so that slipping or accidental collapse is impossible, thus preventing prejudice of the child against its use.

A further object is to provide a relatively strong and substantial auxiliary seat which presents a comfortable support without being bulky or unhandy in its application to the usual seat or in carrying from place to place. And, in the case of a sanitary seat for adults permits of being made of relatively lighter materials. Furthermore, the device is of such a character that it may be easily kept clean and in a thoroughly sanitary condition.

With the above and other objects in view which will more readily appear as the nature of the invention is better understood, the same consists in the novel construction, combination and arrangement of parts, hereinafter more clearly described, illustrated and claimed.

Certain preferred and practical embodiments of the invention are shown in the accompanying drawings in which:—

Figure 1 is a plan view of the improved adjustable seat on the usual closet seat having the wings thereof adjusted for infants ranging from six months to one year of age.

Figure 2 is a view similar to Figure 1 showing a further adjustment of the wings to accommodate infants from one to two years old.

Figure 3 is a plan view showing the wings reversed to accommodate children up to three years.

Figue 4 is a view similar to Figure 3 showing a further adjustment of the same combination of supporting wings for children of four or more years.

Figure 5 is a view showing the infant and child seat folded or collapsed for carrying or packing.

Figure 6 is a side elevation of the construction shown in Figure 5.

Figure 7 is an end elevation thereof.

Figure 8 is a more or less diagrammatic view showing how, by full and dotted lines the wings may be rotated to either one side or the other of the stay piece to form the various seat adjustments.

Figure 9 is a bottom plan view of seat showing location of rubber or equivalent tips, the pair at lower or small ends of the wings being preferably fixed and the pair at the opposite end of the wings being preferably adjustable to either of four or five positions as indicated.

Figure 10 is an enlarged section on the line 10—10 of Figure 8 and showing in detail one form of wing clamping means.

Figures 11 and 11a are detail sectional views showing other forms of clamping devices, the first one presenting a preferred thumb screw control.

Figures 12 and 12a are other detail sectional views showing modifications of the clamping means.

Figures 13, 13a, 13b and 13c show details of rubber or equivalent material tips.

Figure 14 is a section on line 14—14 of Figure 8 showing how the stay piece is preferably beveled to permit free use of the seat and also be comfortable.

Figure 15 is a detail sectional view showing formation of both edge portions of the wings.

Figure 16 shows an infant and child seat in an ordinary coat pocket illustrating its portability and relative size.

Figure 17 shows a modified form or stay piece for connecting the wings.

Figure 18 shows a plan view of a further modified auxiliary seat particularly adapted for adult use on the usual closet seat.

Figure 19 is a plan view of the seat shown in Figure 18 folded for carrying or packing.

Figure 20 is a side elevation of the structure shown in Figure 19.

Figures 21 and 21$^a$ are respectively cross sections, on the lines 21—21 and 21$^a$—21$^a$ of Figure 18.

Figure 22 is a plan view of a further modification of the adult auxiliary seat.

Figure 23 is a view of the seat shown in Figure 22 folded for carrying or packing.

Figure 24 is a partly opened side elevation of the seat shown in Figure 23.

Similar reference characters designate corresponding parts throughout the several figures of the drawings.

In carrying the present invention into effect it is proposed to provide an auxiliary closet seat which includes a relatively fixed stay piece, and a pair of duplex reversible wing members or sections swivelled to the opposite end portions of said stay piece whereby they may be freely rotated or shifted in a plane horizontal to the stay piece to not only obtain a wide range of adjustment between the wings, but at the same time permit of the entire seat being readily collapsed into a compact and easily handled form. In the drawings the stay piece above referred to is designated generally as 1, and the duplicate reversible seat forming sections or wings are designated respectively as 2 and 3, and are suitably connected at their rear ends to the stay piece by a suitable pivot or hinge connection, preferably the novel pivot or hinge 4 hereinafter more fully referred to.

In connection with the stay piece 1 it will be observed that the body of the same is preferably beveled or inclined as indicated at 1$^a$, Figure 14, while one edge thereof is formed with a suitable cut away portion 1$^b$, to thereby insure a comfortable fit and seating for the person. Both of the wings 2 and 3 are connected to the underside of the stay piece 1 as shown in Figures 1 to 9 of the drawings whereby they may have a relatively firm and direct bearing engagement with the usual closet seat S, shown in dotted lines, and to further assist in anchoring the wings upon the said usual seat S it is proposed to provide the same at suitably arranged points with antifriction tips or buttons 5 which may be of rubber, felt or equivalent material, and may assume the various forms shown in Figures 13, 13$^a$, 13$^b$ and 13$^c$, and may be held in place by screws, nails, staples or other equivalent fasteners.

As previously indicated the seat forming sections or wings 2 and 3 are of duplicate formation and are so arranged with reference to each other in the final assembly of the seat that they co-operate to provide clearance openings of various dimensions. That is to say, one edge portion of the wings 2 and 3 is provided with the irregular formation A, which in the relation of the wings shown in Figure 1 of the drawings co-operates to provide between the two wings when abutting a clearance opening M of minimum dimensions, and as shown in Figure 2 a slight separation of the wings 2 and 3 provides a clearance opening M′ of slightly larger dimensions to thus comfortably accommodate a larger infant. By reference to Figure 8 of the drawings, the manner of shifting or adjusting the seat sections 2 and 3 will be readily apparent. That is, by shifting the wing section 2 shown in full lines, in the direction of the arrow to the dotted position 2′ and by shifting the wing 3 from the dotted position 3′ to the full line position 3, the seat is arranged in a position to effect a further series of adjustments such for intance as shown in Figures 3 and 4 of the drawing, making larger openings for larger persons.

As will be observed from Figure 3, the relatively fixed stay piece 1 with this arrangement of the wings 2 and 3 has its sloping body portion disposed toward the wing sections, whereby the cut away portion 1$^b$ is adapted to fully co-operate with the symmetrically curved edge portion B of the wings 2 and 3 to provide a larger clearance opening N, while Figure 4 of the drawings shows how a separation of the wings 2 and 3 may readily provide a larger clearance opening N′.

In each instance where an enlargement of the original clearance opening is provided for the same adjustment of wings, as for instance in Figures 2 and 4, it will be observed that the entire auxiliary seat is moved or shifted slightly rearwardly upon the usual wooden seat S because of the forward tips engaging and traveling along the inner edge of the seat to thus provide a longer and larger seat combination of auxiliary seat and the usual seat, whereby a more effective support for a larger and heavier child is obtained.

From the foregoing it will be apparent that a plurality of adjustments of the wings 2 and 3 may be readily effected by rotating the same on the pivots 4 which connect them with the stay piece. That is to say, with the initial arrangement of wings, as shown in Figure 1 of the drawings, the lateral separation of the free ends of the wings for any desired distance will produce a gradually enlarged clearance opening from the minimum opening shown in Figure 1 to the substantially maximum opening shown in Figure 2 which is probably the largest that may be comfortably obtained with this arrangement of wings. Then, when it is desired to provide a larger clearance opening the wings are each shifted approximately 180° so that the symmetrically curved edges B—B thereof are brought into co-operative relation to provide the minimum enlarged clearance opening N for this combination of the wings. Obviously the lateral separation of the free or meeting ends of the wings 2 and 3 will provide a greater clearance opening N' which of course may be regulated by the amount of lateral separation of the wings. Thus, in this way, a plurality of graduated clearance openings are provided which will comfortably accommodate infants and children of various ages.

A further and important feature of the present invention is that which provides for the ready and compact collapsing or folding thereof to enable the same to be conveniently carried or packed away, and to this end it is proposed to make the pivot element 4 previously referred to of special formation whereby the relative thickness of the several sections may be amply compensated for in the folding or collapsing operation. As shown in Figure 10 of the drawings it is of course necessary to drop one of the wing sections into a plane below the opposite wing section to permit of the entire seat being folded, and to this end it is proposed to employ a novel nut element 6 which is adapted to co-operate with a relatively long screw 7. As will be observed from Figure 10 the said nut element 6 consists of an enlarged hollow body portion having its closed end wall threaded to receive the screw 7, the said nut element in each instance having its flanged end portion countersunk flushly in one of the wing members while its threaded end portion is adapted to telescope in a socket 8 formed in the body of the stay piece 1. Adjacent each of the openings for accommodating the relatively long screws 7 in the body of the stay piece 1, and on the lower face of the latter, there is preferably provided a suitable countersink or depression 9 which assists in giving sufficient resistance to the clamping effect of the screw 7 to rigidly hold the wing members in their adjusted position and thus prevent them from accidentally separating or slipping when in actual use.

Modified types of pivots or hinges are shown in Figures 11, 11ᵃ, 12 and 12ᵃ of the drawings. The construction shown in Figure 11 is substantially the same as described in connection with the pivots shown in Figure 10 with the exception that the screw 7ᵃ is provided with a winged head instead of a slotted head to facilitate the manipulation of the pivot without the assistance of a tool. Figures 11ᵃ, 12 and 12ᵃ show a construction in which the length of the screw is increased over that shown in Figures 10 and 11 and a special form of nut is used at each instance to permit the maximum withdrawal of the screw from the nut without disengagement, to effect as wide a separation of the members as possible to permit of provision of ample clearance therebetween to accommodate one of the wing sections.

Should the anti-slipping tips interfere with the folding of the wing sections, provision is made for removing the tips from the member which is sandwiched between the stay piece and the outermost section and placing the same at the opposite end of the stay piece 1 as shown in Figure 10 of the drawings. That is to say, the rubber or other tips 5 may be removed from the intermediate member of the seat and conveniently placed at each end of the stay piece until it is again desired to open up the seat for use. Furthermore, another novel feature in connection with these rubber tips or anchor elements resides in the provision of a plurality of suitably spaced openings, Figure 9, on the underside of each wing section whereby the said tips may be placed in any one of a plurality of positions according to the diameter of the usual wooden seat, to thus provide a proper fit between the same and the auxiliary seat.

A slightly modified type of a child's auxiliary seat is shown in Figure 17 of the drawings wherein the stay piece 10 is of a more pronounced arc shape instead of the substantially arc or curved shape shown in Figures 1 to 9 of the drawings. In this instance however, all of the other features of the invention are preserved as regards the wing sections 2 and 3 and their pivot connections at 4 with the stay piece.

As further showing the range of application of the invention reference may be made to Figures 18 to 24 of the drawings which illustrate the features heretofore described embodied in a seat particularly adapted for use as a sanitary seat by adults. In this embodiment of the invention the seat essentially consists of a relatively fixed stay piece 11 having the general cross sectional shape shown in Figure 21, and also having pivoted at opposite points thereof as indicated at 12 the complemental wings 13 and 14 which are preferably of the cross sectional shape shown in Figure 21ᵃ of the drawing and whose free ends hold down a suitable protecting web of paper 15 to completely safeguard and protect the user of the auxiliary seat at a point between the variable opening at the ends of the wings. This form of the invention is particularly susceptible of embodiment in relatively light material such as paper, card-board or the like and because of this feature the relative resiliency of the several members afford any easy and convenient means of collapsing the entire structure whereby when the members are in folded relation they have a compactly nested relation as shown in Figure 20 of the drawings.

A further modification of the invention for use along the same lines of the invention suggested in Figures 18, 19 and 20 is shown in Figures 22, 23 and 24 of the drawings. In this form of the invention the essential characteristics of a pair of wing sections 16 and 17 hingedly connected to an intermediate stay piece 18 are carried out. However, as shown it is proposed to fold the wing sections back onto the stay piece along the lines x—x to provide for the collapsing or folding of the entire seat structure. Thus, in its folded or collapsed form the seat presents a substantial Z-shaped appearance as shown in Figure 24 of the drawings.

From the foregoing it will be apparent that the present invention has primarily in view the provision of an auxiliary seat which may be readily adjusted to suit practically all requirements, and at the same time provide a comfortable and strong device when in use, as well as one which gives complete protection and is also readily folded to be carried from place to place.

I claim:

1. An auxiliary closet seat comprising a relatively fixed stay piece and a pair of seat forming wings pivotally connected with opposite ends thereof and adapted to be swung to either side of the stay piece in a plane parallel thereto.

2. An auxiliary closet seat comprising a relatively fixed stay piece and a pair of duplicate wings pivotally connected with opposite ends thereof and adapted to be swung to either side of the stay piece in a plane parallel thereto.

3. An auxiliary closet seat comprising a relatively fixed stay piece and a pair of seat forming wings each pivoted at one end to the stay piece whereby their free ends may be swung in planes parallel to the body of the stay piece and to either side thereof.

4. An auxiliary closet seat comprising a relatively fixed stay piece, and a pair of seat forming wings pivotally connected with the stay piece and each having matching edge portions on both sides thereof of similar construction, whereby the wings may be swung to either one side or the other of the stay piece to form different seat combinations.

5. An auxiliary closet seat comprising a relatively fixed stay piece, duplicate seat forming wings pivotally connected to opposite ends of the said stay piece whereby the free ends thereof may be brought into substantially contacting relation at either side of the stay piece to form different seat combinations, or nested one adjacent the other, within the limits of the stay piece, to effect the collapse of the seat.

6. An auxiliary closet seat comprising a stay piece having a beveled body and an intermediate curved portion, and a pair of wing members pivoted adjacent opposite ends of the stay piece and each having symmetrical edge portions for co-operating with the beveled body and intermediate curved portion of the stay piece, to provide a relatively large opening, and also having opposite symmetrical edge portions formed to provide relatively small complemental clearance recesses.

7. A seat of the class described including a relatively fixed stay piece, a pair of adjustable seat forming wings, and pivot means for connecting said wings to the stay piece, said pivot means being extensible in the line of the axis of the pivot to permit the wings which are normally in the same plane to come into registering relation with each other and with the stay piece.

8. A seat of the class described including a relatively fixed stay piece, a pair of seat forming wings, and pivot means for connecting the wings to the stay piece including a nut element carried by each of the wings and cooperating with a socket in the stay piece, and a screw also carried by the stay piece and engaging with the said nut to provide an axially extensible pivot connection.

9. A folding closet seat comprising a back stay piece and a pair of seat-forming symmetrical wings connected with the stay piece and provided upon both edges with openings of varying sizes.

10. A folding seat of the class described, comprising a relatively rigid stay piece and relatively rigid seat forming wings, means for pivoting the wings to the stay piece whereby one of the wings may be moved axially on its pivot to clear the other wing when the same are folded into registry with the stay piece.

11. A folding seat of the class described comprising a relatively rigid stay piece and relatively rigid seat forming wings, and pivot means for connecting the wings to the stay piece and adapted to permit the circumferential shifting of the wings as well as the axial movement thereof to prevent interference of one wing with another when folded into registering relation with the stay piece.

12. An auxiliary seat of the class described comprising three arc-shaped pieces, and means constituting the pivot for connecting the seat members and also adapted to securely clamp the said three pieces in their adjusted positions.

13. An auxiliary seat of the class described comprising three arc-shaped pieces, and means constituting the pivot for connecting the said seat members and adapted to permit one of the seat sections to swing clear of the other to permit of the same being brought into registry, and also serving as means to tightly clamp the members in folded registering relation.

14. An auxiliary closet seat comprising three members adjustably connected and having adjustable members on the underside of two of these members so positioned as to register with the inner edge of the usual closet seat.

In testimony whereof I hereunto affix my signature in the presence of two witnesses.

MEIER GEO. HILPERT.

Witnesses:
G. E. SELLERS,
ROYCE KOCH.